United States Patent
Schreiber et al.

(10) Patent No.: US 8,536,297 B2
(45) Date of Patent: Sep. 17, 2013

(54) COATING COMPOSITION

(75) Inventors: Peter J. Schreiber, Bourbonnais, IL (US); Samuel L. Lane, Baton Rouge, LA (US); Paul L. Wiggins, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 0 days.

(21) Appl. No.: 13/515,582

(22) PCT Filed: Dec. 16, 2010

(86) PCT No.: PCT/US2010/060775
§ 371 (c)(1),
(2), (4) Date: Jun. 13, 2001

(87) PCT Pub. No.: WO2011/084602
PCT Pub. Date: Jul. 14, 2011

(65) Prior Publication Data
US 2012/0252971 A1    Oct. 4, 2012

Related U.S. Application Data

(60) Provisional application No. 61/287,512, filed on Dec. 17, 2009.

(51) Int. Cl.
*C08G 18/32*    (2006.01)

(52) U.S. Cl.
USPC .................................. 528/68; 528/52; 528/64

(58) Field of Classification Search
USPC ................................................ 528/52, 64, 68
See application file for complete search history.

(56) References Cited

U.S. PATENT DOCUMENTS

| | | | |
|---|---|---|---|
| 3,979,126 A * | 9/1976 | Dusbiber | 473/372 |
| 5,688,892 A | 11/1997 | Ishii et al. | |
| 6,865,988 B1 * | 3/2005 | Sasaki | 101/483 |
| 2006/0111542 A1 | 5/2006 | Dewanjee | |

FOREIGN PATENT DOCUMENTS

| | | |
|---|---|---|
| DE | 19732313 A1 | 2/1998 |
| GB | 1341018 | 12/1973 |
| JP | 3445364 B2 | 9/2003 |
| WO | 2002/00751 A1 | 1/2002 |
| WO | 2005/003203 A2 | 1/2005 |

* cited by examiner

*Primary Examiner* — Peter Szekely
(74) *Attorney, Agent, or Firm* — James A. Jubinsky; Marcy M. Hoefling; Nathan C. Dunn

(57) ABSTRACT

The present invention relates to a coating composition. More particularly the present invention relates to a coating composition comprising an amine curative composition comprising a bis-aromatic secondary diamine, a bis-aromatic primary diamine and optionally a mono-aromatic primary diamine.

19 Claims, No Drawings

COATING COMPOSITION

FIELD OF THE INVENTION

The present invention relates to a coating composition. More particularly the present invention relates a coating composition comprising an amine curative composition comprising a bis-aromatic secondary diamine, a bis-aromatic primary diamine and optionally a mono-aromatic primary diamine.

BACKGROUND OF THE INVENTION

Polyurethane and polyurea coatings have been employed in a large number of uses such as coatings for roofs, floors, or surfaces exposed to outdoor conditions. Two component (2K) polyurethane or polyurea coatings are typically prepared by in-situ mixing together and reacting of a curing agent with an isocyanate-terminated prepolymer.

The isocyanate-terminated prepolymer is obtained by reacting a polyol or polyamine with an isocyanate (e.g., toluene diisocyanate or "TDI"). One of the most widely used curing agents for polyurethane coatings is 4,4'-methylenebis(2-chloroaniline) (hereinafter referred to simply as "MOCA"). Optional additives may be also used such as an organometallic lead catalyst and plasticizers. Following mixing, the coating is typically applied by hand with the use of a trowel, spatula or rake.

MOCA is conventionally used as the curing agent for polyurethane coatings because it has some favorable attributes. For example, it reacts with the isocyanate-terminated prepolymer relatively mildly and can ensure a workable pot life. Pot life is the period of time elapsed after the mixing of the prepolymer and curing agent during which the mixture can be applied without undue trouble, generally defined as the time elapsed after mixing up until a viscosity increase to one hundred thousand centipoises. Furthermore, MOCA provide the polyurethane coatings with various physical/mechanical properties such as good hardness, tensile strength, elongation at break and tear strength. These properties are important especially when the polyurethane is used as a waterproof coating. Therefore, MOCA is widely used as a curative due to the properties that it imparts to polyurethane waterproof coatings.

However, MOCA has a number of disadvantages. The most severe disadvantage is that according to the International Agency for Research on Cancer (IARC), MOCA is carcinogenic to humans and thus a safety and health concern to the workers who apply the coatings and to the consumer who are exposed to improperly formulated coatings. (See also Carcinogenicity of Some Aromatic Amines, Organic Dyes, and Related Exposures, The Lancet Oncology, Volume 9, Issue 4, Pages 322-323, April 2008, which describes that MOCA causes tumors at many sites in mice and rats and bladder tumors in dogs).

In addition, MOCA is a solid and highly crystalline at room temperature, which makes it difficult to dissolve, prone to precipitation and thus hard to work with in coating applications.

Accordingly, there is a need to develop a curing agent for polyurethane or polyurea coatings, which doesn't have the safety and health concerns of MOCA and provides the polyurethane or polyurea coatings with good physical/mechanical properties.

Japanese Patent No. 3445364 B discloses polyurethanes, useful as waterproof coatings, where the curing agent consists of 4,4'-bis(sec-butylamino) diphenylmethane (SBMDA) and diethyltoluene-diamine (DEDTA).

SUMMARY OF THE INVENTION

The present invention relates to a coating composition comprising:

a) an amine curative composition comprising: (i) about 60 mol % to about 90 mol % of a bis-aromatic secondary diamine having Formula I

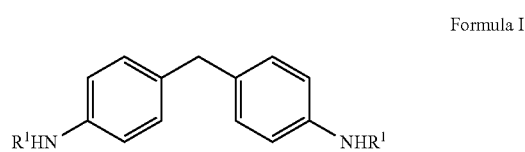

Formula I wherein each $R^1$ is independently a $C_1$-$C_{10}$ alkyl, (ii) about 10 mol % to about 40 mol % of a bis-aromatic primary diamine having the Formula II

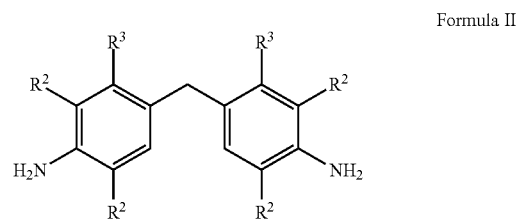

Formula II wherein each $R^2$ is independently a $C_1$-$C_{10}$ alkyl; and each $R^3$ is independently chlorine, bromine, fluorine or hydrogen, and wherein the mol % is based on the total moles of the bis-aromatic secondary diamine and the bis-aromatic primary diamine; and (b) a pre-polymer having free isocyanate (NCO) groups;

wherein the molar ratio of the NCO groups in the pre-polymer to the amine (—$NH_2$) groups in the amine curative composition ranges from about 0.8 to about 2.0.

DETAILED DESCRIPTION OF THE INVENTION

The present invention relates to a coating composition comprising:

a) an amine curative composition comprising: (i) about 60 mol % to about 90 mol % of a bis-aromatic secondary diamine having Formula I

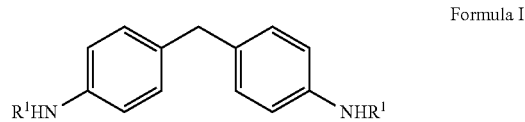

Formula I wherein each $R^1$ is independently a $C_1$-$C_{10}$ alkyl; and (ii) about 10 mol % to about 40 mol % of a bis-aromatic primary diamine having the Formula II

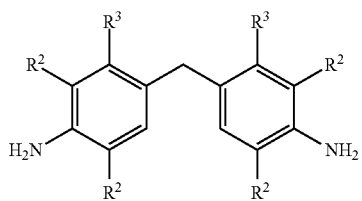

Formula II wherein each $R^2$ is independently a $C_1$-$C_{10}$ alkyl; and each $R^3$ is independently chlorine, bromine, fluorine or hydrogen, and wherein the mol % is based on the total moles of the bis-aromatic secondary diamine and the bis-aromatic primary diamine; and (b) a pre-polymer having free isocyanate (NCO) groups; wherein the molar ratio of the NCO groups in the prepolymer to the amine (—NH$_2$) groups in the amine curative composition ranges from about 0.8 to about 2.0.

One embodiment is where the bis-aromatic secondary diamine of Formula I is selected from the group consisting of: 4,4'-bis(sec-butylamino)diphenylmethane (SBMDA).

Another embodiment is where the bis-aromatic primary diamine of Formula II is selected from the group consisting of 4,4'-methylene-bis-(2-ethyl-6-methyl-aniline) (NMMEA); 4,4'-methylene-bis-(2,6-diethylaniline) (MDEA); 4,4'-methylene-bis-(2-isopropyl-6-methyl-aniline) (MMIPA); methylene-bis-ortho-chloroaniline (MBOCA); 4,4'-methylene-bis-(2-methylaniline) (MMA); 4,4'-methylene-bis-(2-chloro-6-ethylaniline) (MCEA); 4,4'-methylene-bis-(3-chloro-2,6-diethylaniline) (MCDEA); 4,4'-methylene-bis(2,6-diisopropylaniline) (MDIPA) or mixtures thereof.

In another embodiment, the amount of bis-aromatic secondary diamine of Formula I may range 65 mol % to about 85 mol % or from about 70 mol % to about 80 mol % based on the total moles of the bis-aromatic secondary diamine and the bis-aromatic primary diamine. The amount of bis-aromatic primary diamine of Formula II may range from about 15 mol % to about 35 mol % or from about 20 mol % to about 30 mol % based on the total moles of the bis-aromatic secondary diamine and the bis-aromatic primary diamine.

This invention also relates to a coating composition comprising:

a) an amine curative composition comprising: (i) greater than about 50 mol % of a bis-aromatic secondary diamine having Formula I

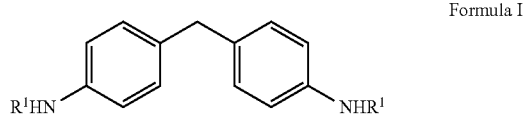

Formula I wherein each $R^1$ is independently a $C_1$-$C_{10}$ alkyl, (ii) about 3 mol % to about 47 mol % of a bis-aromatic primary diamine having the Formula II

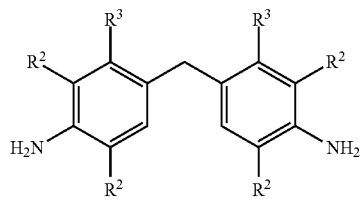

Formula II wherein each $R^2$ is independently a $C_1$-$C_{10}$ alkyl; and each $R^3$ is independently chlorine, bromine, fluorine or hydrogen; and (iii) about 3 mol % to about 47 mol % of a mono-aromatic primary diamine having the Formula IIIa, IIIb or mixtures thereof;

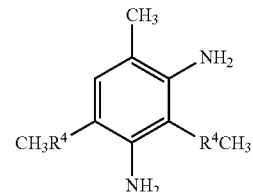

Formula IIIa

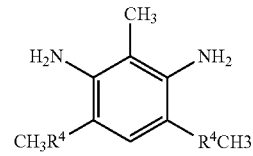

Formula IIIb wherein each $R^4$ is independently —CH$_2$— or —S—; wherein the mol % is based on the total moles of the bis-aromatic secondary diamine, the bis-aromatic primary diamine and the mono-aromatic primary diamine; and (b) a prepolymer having free isocyanate (NCO) groups; wherein the molar ratio of the NCO groups in the prepolymer to the amine (—NH$_2$) groups in the amine curative composition ranges from about 0.8 to about 2.0.

In other embodiments, the amount of bis-aromatic secondary diamine of Formula I may range 55 mol % to about 90 mol % or from about 60 mol % to about 85 mol % based on the total moles of the bis-aromatic secondary diamine, the bis-aromatic primary diamine and the mono-aromatic primary diamine. The amount of bis-aromatic primary diamine of Formula II may range from about 5 mol % to about 30 mol % or from about 10 mol % to about 25 mol % based on the total moles of the bis-aromatic secondary diamine, the bis-aromatic primary diamine and the mono-aromatic primary diamine. The amount mono-aromatic primary diamine having the Formula IIa, IIIb or mixtures thereof may range from about 5 mol % to about 30 mol % or from about 10 mol % to about 25 mol % based on the total moles moles of the bis-aromatic secondary diamine, the bis-aromatic primary diamine and the mono-aromatic primary diamine.

One embodiment is where the bis-aromatic secondary diamine of Formula I is selected from the group consisting of: 4,4'-bis(sec-butylamino) diphenylmethane (SBMDA).

Another embodiment is where the bis-aromatic primary diamine of Formula II is selected from the group consisting of 4,4'-methylene-bis-(2-ethyl-6-methyl-aniline) (NMMEA); 4,4'-methylene-bis-(2,6-diethylaniline) (MDEA); 4,4'-methylene-bis-(2-isopropyl-6-methyl-aniline) (MMIPA); methylene-bis-ortho-chloroaniline (MBOCA); 4,4'-methylene-bis- (2-methylaniline) (MMA); 4,4'-methylene-bis-(2-chloro-6-ethylaniline) (MCEA); 4,4'-methylene-bis-(3-chloro-2,6-diethylaniline) (MCDEA); 4,4'-methylene-bis(2,6-diisopropylaniline) (MDIPA) or mixtures thereof.

Another embodiment is where the mono-aromatic primary diamine of Formulas IIIa or IIIb is selected from the group consisting of 3,5-diethyltoluene-2,4-diamine, 3,5-diethyltoluene-2,6-diamine or mixtures thereof. The mixture of these two compounds is commonly named DEDTA and an example of a commercial product is Ethacure 100 from Albemarle Corporation.

The term "alkyl", as used herein, includes saturated monovalent hydrocarbon radicals having straight or branched moieties. Examples of alkyl groups include, but are not limited to, methyl, ethyl, propyl, isopropyl, butyl, isobutyl, t-butyl, pentyl and hexyl The isocyanate-terminated prepolymer may be formed by the reaction between excess toluene diisocyanate (TDI) and a polyol, excess "high 2,4-MDI" and a polyol, excess toluene diisocyanate (TDI) and a polyamine, excess "high 2,4-MDI" and a polyamine or blends thereof. Preferably, the isocyanate-terminated prepolymer is a polyurethane prepolymer formed by the reaction between excess toluene diisocyanate (TDI) and a polyol or excess "high 2,4-MDI" and a polyol or blends thereof.

Commercially available TDI whose 2,4-isomer content ranges from 65 to 100% by weight can be used as the starting TDI in the production of the isocyanate-terminated prepolymer. The isocyanate-terminated prepolymer formed from TDI whose 2,4-isomer content is low is likely to have a short pot life. Therefore, for obtaining a desired pot life, it is preferred to employ TDI whose 2,4-isomer content is at least 80% by weight, especially at least 85% by weight.

"High 2,4-MDI" is defined as diphenylmethane diisocyanate comprising:(i) from 10 to 60% by weight of 2,4'-diphenylmethane diisocyanate, (ii) less than 6% by weight of 2,2'-diphenylmethane diisocyanate, and (iii) the balance being 4,4'-diphenylmethane diisocyanate.

The polyol that may be used to form the prepolymer may be any polyol conventionally used in polyurethane coatings. Preferably, the polyol is a polyoxypropylene polyol, a polyoxyethylenepropylene polyol, polytetramethyleneether glycol, polyester, polycaprolactone or mixtures thereof.

The polyamine that may be used to form the prepolymer may be any polyamine conventionally used in polyurea coatings. Preferably, the polyamine is a polyoxypropylene polyamine or a polyoxyethylenepropylene polyamine For obtaining the desired isocyanate-terminated prepolymer, it is preferred that the polyol or polyamine have an average molecular weight of 1000 to 8000, preferably 1700 to 6000. It is further preferred that 30 to 90% by weight of the above polyol or polyamine is a dial or diamine. It is also preferred that the hydroxyl or amine functionality of the prepolymer be equal or greater than about 2.

Examples of some commercial polyols that may be used are Voranol® polyols, from the Dow Chemical Company, and Pluracol® polyols from the BASF Corporation.

Examples of commercially available polyamines are Jeffamine® and XTJ polyamines from Huntsman Performance Products and polyetheramines from BASF such as Polyetheramines D2000.

The isocyanate-terminated prepolymer should have an NCO group content ranging from about 1.0 to about 15.0% by weight or from about 1.25 to about 10.0% by weight or from about 1.5 to about 5.0% by weight, based on the total weight of the prepolymer.

Commercial available prepolymers may be used in this invention. Non-limiting examples of such commercial prepolymers are Airthane® and Versathane® polyurethane prepolymers from Air Products and Chemicals Inc., Adiprene® and Vibrathane® prepolymers from Chemtura Corporation, Takenate® prepolymers from Mitsui Chemicals, Echelon™ Polyurethane prepolymer from Dow Chemicals Company, Imuthane™ Polyurethane prepolymer from C.O.I.M. S.p.A, and Baytec® Polyurethane prepolymers from Bayer Material Sciences.

Conventional plasticizers, which are not reactive with the NCO groups of the isocyanate-terminated prepolymer, may also be used in this invention. Non-limiting examples of such plasticizers include dibutyl, diheptyl, dioctyl and butyl benzyl phthalates, dioctyl adipate, chlorinated paraffin, tricresyl phosphate, and tris($\beta$-chloropropyl)phosphate.

The above plasticizer should be added to the amine curative composition component of the coating composition. The amount of plasticizer that may be used is in the amount of from about 20 to about 130 parts by weight, or from about 30 to about 120 parts by weight, or from about 40 to about 100 parts by weight per 100 parts by weight of the isocyanate-terminated prepolymer.

An inorganic filler may also be used in this invention. Examples of such fillers include, but are not limited to: calcium carbonate, talc, kaolin, zeolite or diatom earth, a pigment such as chromium oxide, red iron oxide, iron oxide, carbon black or titanium oxide.

The above fillers should be added to the amine curative composition component of the coating composition. The amount of filler that may be used is in the amount ranges from about 5 to about 150 parts by weight, or from about 10 to about 120 parts by weight, or from about 15 to about 100 parts by weight per 100 parts by weight of the isocyanate-terminated prepolymer.

Stabilizers may also be present in the composition such as an hindered amines, hindered phenols or a benzotriazole compounds.

The amount of prepolymer to the amine curative composition should range such that that the molar ratio of the NCO groups in the prepolymer to the amine (—$NH_2$ groups) in the amine curative composition ranges from about 0.8 to about 2.0, or from about 0.85 to about 1.7.

This invention further relates to a coating comprising mixing or reacting the amine curative composition with the prepolymer.

The pot life of the coating should range from about from 45 min to 180 min or preferably from 60 min to about 150 minutes. This will allow sufficient time for the components to be mixed and applied since these coating are typically applied by manual operations where workers use a trowel, spatula or rake.

It is also desirable that the coating has certain mechanical film properties especially when it is used as a waterproofing coating. For example, the Japanese Industrial Standard for roof coatings (JIS A 6021) requires that the tensile strength at 20° C. should be greater than 245.2 $N/cm^2$ (356 psi), the tear strength at 20° C. should be greater than 147 N/cm (84 lb/inch), and elongation at break at 20° C. should be greater than 450%. The hardness of the coating should be greater than 30 or preferably greater than 50 on the Shore A hardness scale. The coating of the present invention may be used as a waterproofing coating for roofs, floors, or surfaces exposed to outdoor conditions, such as concrete floors.

The following Examples illustrate the present invention. It is to be understood, however, that the invention, as fully described herein and as recited in the claims, is not intended to be limited by the details of the following Examples.

EXAMPLES

Example 1

Preparation of Polyurethane Coating using 80/20 SBMDA/MDEA Curative Composition 100 g of a TDI prepolymer (3.52% NCO Airthane® PPT-80a, Air Products and Chemicals) was charged into a 500 mL plastic beaker. 50 g of calcium carbonate was layered on top of the prepolymer. In a separate beaker, 2.17 g of 4,4'-methylene-bis-(2,6-diethylaniline) (MDEA) (Lonzacure® M-DEA from Lonza Group Ltd) was dissolved in 8.67 g 4,4'-bis-(sec-butylamino) diphenylmethane (SBMDA) (Ethacure® 420 from Albemarle Corporation) and 39.2 g dioctyl phthalate (DOP) from Sigma-Aldrich Corporation. This amine curative blend composition consisted of an 80/20 molar ratio of SBMDA/MDEA.

Once dissolved, the amine curative blend composition was poured on top of the calcium carbonate. The curing agent, calcium carbonate, and prepolymer were stirred using a mechanical stirrer fitted with a 2.5-inch 3-propeller stir-blade set at 1000 rpm. The mixture was stirred for 1.5 minutes. 20 mL of the mixture was poured into a 30 mL dram vial and placed under a viscometer, then used to measure the viscosity rise of the mixture. A Brookfield DV-I viscometer fitted with an RV-7 spindle was used to determine the pot-life of the coating. The pot-life was defined as the time from the end of mixing to the time at which the viscosity reached 100,000 cPs (U.S. Pat. No. 5,688,892).

The rest of the mixture was poured onto an 8 inch×11 inch piece of release paper fixed to a flat, horizontal level surface with ⅛ inch aluminum rails clamped to the 3 edges of the substrate. The mixture was poured at one end of the mold and drawn down to the open end of the mold. Excess mixture was pulled away from the mold. The typical thickness of the resulting coatings were about 0.1 inch (2.5 mm)

The temperature of the formulations and molds were room temperature, 23-24° C. The resulting pot-life was 88 minutes. The coating sat undisturbed for 7 days at room temperature to allow for full cure. The coating was cut into appropriate test shapes for physical property testing at about 24° C. (Tensile strength ASTM D-412; Tear Strength ASTM D-624; Hardness ASTM D-2240).

Examples 2-4

Preparation of Polyurethane Coating using SBMDA/MDEA Curative Composition

The same procedure as Example 1 was repeated, with the exception that the molar ratio of the MDEA and SBMDA amine curative blend composition was modified. Enough DOP was added to bring the mass of the curing agent to 50 g, or ½ the mass of the prepolymer. The total mass of the mixture was 200 g in every example. Pot Life and mechanical properties for these examples are shown in Table 1.

Examples 5-7

Preparation of Polyurethane Coating using SBMDA/MDEA/DETDA Curative Composition The same procedure as Example 1 was used, with the exception that amine curative blend composition consists of a ternary blend of SBMDA, MDEA and DETDA (Ethacure® 100 from Albemarle Corporation). Enough DOP was added to bring the mass of the curing agent to 50 g, or ½ the mass of the prepolymer. The total mass of the mixture was 200 g in every example. Pot Life and mechanical properties for these examples are shown in Table 1.

Comparative Examples 8-11

Preparation of Polyurethane Coating using SBMDA/DETDA Curative Composition

The same procedure as Example 1 was used, with the exception that the amine curative blend composition consists of a blend of SBMDA and DETDA. Enough DOP was added to bring the mass of the curing agent to 50 g, or ½ the mass of the prepolymer. The total mass of the mixture was 200 g in every example. Pot Life and mechanical properties for these examples are shown in Table 1.

TABLE 1

Formulation and Property Data for Examples 1-11

| | Example | | | | | | | | | | |
|---|---|---|---|---|---|---|---|---|---|---|---|
| | 1 | 2 | 3 | 4 | 5 | 6 | 7 | C-8 | C-9 | C-10 | C-11 |
| A-side | | | | | | | | | | | |
| Prepolymer | Air Products PPT-80a | | | | | | | | | | |
| mass PP | 100 | | | | | | | | | | |
| % NCO | 3.52 | | | | | | | | | | |
| Index | 1.20 | | | | | | | | | | |
| B-side (component masses) | | | | | | | | | | | |
| mass MDEA | 2.17 | 3.25 | 4.34 | 5.42 | 1.08 | 1.63 | 2.17 | 0 | 0 | 0 | 0 |
| mass SBMDA | 8.67 | 7.59 | 6.50 | 5.42 | 8.67 | 7.59 | 6.50 | 9.74 | 8.63 | 7.26 | 6.52 |
| mass DETDA | 0 | 0 | 0 | 0 | 0.62 | 0.93 | 1.24 | 0.62 | 1.24 | 2.05 | 2.50 |
| mass DOP | 39.2 | 39.2 | 39.2 | 39.2 | 39.6 | 39.9 | 40.1 | 40.2 | 41.3 | 50.0 | 50.0 |
| mass CaCO3 | 50.0 | 50.0 | 50.0 | 50.0 | 50.0 | 50.0 | 50.0 | 50.0 | 50.0 | 50.0 | 50.0 |
| B-side (mole % amines) | | | | | | | | | | | |
| % eq MDEA | 20 | 30 | 40 | 50 | 10 | 15 | 20 | 0 | 0 | 0 | 0 |
| % eq SBMDA | 80 | 70 | 60 | 50 | 80 | 70 | 60 | 90 | 80 | 67 | 60 |
| % eq DETDA | 0 | 0 | 0 | 0 | 10 | 15 | 20 | 10 | 20 | 33 | 40 |

TABLE 1-continued

Formulation and Property Data for Examples 1-11

| | Example | | | | | | | | | | |
|---|---|---|---|---|---|---|---|---|---|---|---|
| | 1 | 2 | 3 | 4 | 5 | 6 | 7 | C-8 | C-9 | C-10 | C-11 |
| Properties | | | | | | | | | | | |
| Pot-life (min) | 88 | 59 | 43 | 32 | 142 | 92 | 64 | ~240 | 176 | 94 | 69 |
| Hardness (A) | 57 | 65 | 69 | 70 | 48 | 55 | 60 | 28 | 40 | 50 | 52 |
| Tensile (psi) | 427 | 499 | 503 | 662 | 443 | 469 | 522 | 269 | 372 | 429 | 430 |
| Elongation (%) | 697 | 518 | 424 | 396 | 839 | 670 | 616 | 1177 | 1019 | 716 | 649 |
| Tear (lb/in) | 91.8 | 116 | 128 | 142 | 86.7 | 113 | 119 | 48.7 | 67 | 89 | 98 |

The results demonstrate that the polyurethane coatings using the amine curative blend compositions of the present invention have good pot life (43 to 142 minutes) and overall better mechanical properties than Comparative Examples 8 to 11 of the prior art. In addition, the inventive polyurethane coating examples of the present invention demonstrate that they have the pot life and mechanical properties to be useful as waterproof coatings under the Japanese JIS A 6021 standard.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention described and claimed herein is not to be limited in scope by the specific examples and embodiments herein disclosed, since these examples and embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The invention claimed is:

1. A composition comprising:
a) an amine curative composition comprising:
(i) about 60 mol % to about 90 mol % of a bis-aromatic secondary diamine having Formula I

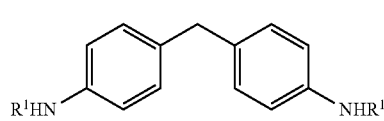

wherein each $R^1$ is independently a $C_1$-$C_{10}$ alkyl; and
(ii) about 10 mol % to about 40 mol % of a bis-aromatic primary diamine having the Formula II

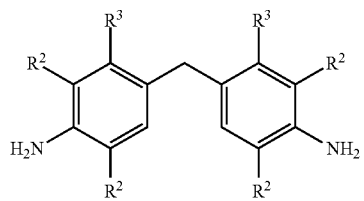

wherein each $R^2$ is independently a $C_1$-$C_{10}$ alkyl; and each $R^3$ is independently chlorine, bromine, fluorine or hydrogen, and wherein the mol % is based on the total moles of the bis-aromatic secondary diamine and the bis-aromatic primary diamine; and
(b) a prepolymer having free isocyanate (NCO) groups; wherein the molar ratio of the NCO groups in the pre-polymer to the amine (—$NH_2$) groups in the amine curative composition ranges from about 0.8 to about 2.0.

2. The composition of claim 1, wherein the bis-aromatic secondary diamine of Formula I is selected from the group consisting of: 4,4'-bis(sec-butylamino)diphenylmethane.

3. The composition of claim 1, wherein the bis-aromatic primary diamine of Formula II is selected from the group consisting of 4,4'-methylene-bis-(2-ethyl-6-methyl-aniline) (NMMEA); 4,4'-methylene-bis-(2,6-diethylaniline) (MDEA); 4,4'-methylene-bis-(2-isopropyl-6-methyl-aniline) (MMIPA); methylene-bis-ortho-chloroaniline (MB-OCA); 4,4'-methylene-bis-(2-methylaniline) (MMA); 4,4'-methylene-bis-(2-chloro-6-ethylaniline) (MCEA); 4,4'-methylene-bis-(3-chloro-2,6-diethylaniline) (MCDEA); 4,4'-methylene-bis(2,6-diisopropylaniline) (MDIPA) or mixtures thereof.

4. The composition of claim 3, wherein the bis-aromatic primary diamine of Formula II is 4,4'-methylene-bis-(2,6-diethylaniline) (MDEA).

5. A composition comprising:
a) an amine curative composition comprising:
(i) greater than about 50 mol % of a bis-aromatic secondary diamine having Formula I

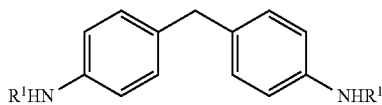

Formula I wherein each $R^1$ is independently a $C_1$-$C_{10}$ alkyl,
(ii) about 3 mol % to about 47 mol % of a bis-aromatic primary diamine having the Formula II

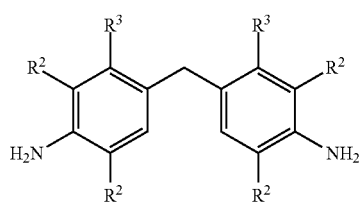

Formula II wherein each $R^2$ is independently a $C_1$-$C_{10}$ alkyl; and each $R^3$ is independently chlorine, bromine, fluorine or hydrogen; and
(iii) about 3 mol % to about 47 mol % of a mono-aromatic primary diamine having the Formula IIa, IIIb, or mixtures thereof;

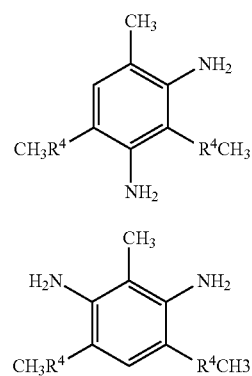

Formula IIIa

Formula IIIb wherein each $R^4$ is independently —$CH_2$— or —S—;
wherein the mol % is based on the total moles of the bis-aromatic secondary diamine, the bis-aromatic primary diamine and the mono-aromatic primary diamine; and
(b) a prepolymer having free isocyanate (NCO) groups;
wherein the molar ratio of the NCO groups in the prepolymer to the amine (—$NH_2$) groups in the amine curative composition ranges from about 0.8 to about 2.0.

6. The composition of claim 5, wherein the bis-aromatic secondary diamine of Formula I is selected from the group consisting of: 4,4'-bis(sec-butylamino) diphenylmethane.

7. The composition of claim 5, wherein the bis-aromatic primary diamine of Formula II is selected from the group consisting of 4,4'-methylene-bis-(2-ethyl-6-methyl-aniline) (NMMEA); 4,4'-methylene-bis-(2,6-diethylaniline) (MDEA); 4,4'-methylene-bis-(2-isopropyl-6-methyl-aniline) (MMIPA); methylene-bis-ortho-chloroaniline (MB-OCA); 4,4'-methylene-bis-(2-methylaniline) (MMA); 4,4'-methylene-bis-(2-chloro-6-ethylaniline) (MCEA); 4,4'-methylene-bis-(3-chloro-2,6-diethylaniline) (MCDEA); 4,4'-methylene-bis(2,6-diisopropylaniline) (MDIPA) or mixtures thereof.

8. The composition of claim 7, wherein the bis-aromatic primary diamine of Formula II is 4,4'-methylene-bis-(2,6-diethylaniline) (MDEA).

9. The composition of claim 5, wherein the mono-aromatic primary diamine of Formulas IIIa or IIIb is selected from the group consisting of 3,5-diethyltoluene-2,4-diamine, 3,5-diethyltoluene-2,6-diamine or mixtures thereof.

10. The composition of claim 1 or 5, wherein said prepolymer is a polyurethane prepolymer made by the reaction of excess toluene diisocyanate (TDI) and a polyol or an excess of high 2,4-MDI and a polyol or blends thereof.

11. The composition of claim 10, wherein said polyol is a polyoxypropylene polyol, polyoxyethylenepropylene polyol, polytetramethyleneether glycol, polyester, polycaprolactone or mixtures thereof.

12. The composition of claim 10, wherein said polyurethane prepolymer has a NCO group content of about 1% to 15% by weight.

13. The composition of claim 1 or 5, further comprising a plasticizer in an amount of from about 20 parts to about 130 parts by weight per 100 parts pre-polymer.

14. The composition of claim 13, further comprising a filler in an amount from about 10 parts to about 150 parts by weight per 100 parts prepolymer.

15. The composition of claim 13, wherein said plasticizer is dibutyl phthalate, diheptyl phthlate, dioctyl phthalate, butyl benzyl phthalate, dioctyl adipate, tricresyl phosphate, chlorinated paraffin, tris(β-chloropropyl)phosphate or mixtures thereof and wherein said filler is calcium carbonate, talc, kaolin, zeolite, or diatom earth.

16. A coating composition comprising reacting or mixing the amine curative composition with the prepolymer of claim 1 or 5.

17. The coating composition of claim 16, wherein said prepolymer is a polyurethane prepolymer made by the reaction of excess toluene diisocyanate (TDI) and a polyol or an excess of high 2,4-MDI and a polyol or blends thereof.

18. The coating composition of claim 17, wherein said coating is used as a water-proofing coating for roofs, floors, or surfaces exposed to outdoor conditions.

19. The coating composition of claim 18, wherein said surfaces exposed to outdoor conditions are made of concrete.

* * * * *